United States Patent
Shah et al.

(10) Patent No.: US 9,251,527 B2
(45) Date of Patent: Feb. 2, 2016

(54) SYSTEM AND METHOD FOR PROVIDING PERSONALIZED RECOMMENDATIONS

(75) Inventors: Devavrat Shah, Newton, MA (US); Vivek Francis Farias, Cambridge, MA (US); Srikanth Jagabathula, New York, NY (US); Ammar Tawfiq Ammar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 478 days.

(21) Appl. No.: 13/598,124

(22) Filed: Aug. 29, 2012

(65) Prior Publication Data

US 2013/0054498 A1 Feb. 28, 2013

Related U.S. Application Data

(60) Provisional application No. 61/528,751, filed on Aug. 29, 2011.

(51) Int. Cl.
*G06F 15/18* (2006.01)
*G06Q 30/02* (2012.01)

(52) U.S. Cl.
CPC ........ *G06Q 30/0201* (2013.01); *G06Q 30/0204* (2013.01)

(58) Field of Classification Search
None
See application file for complete search history.

(56) References Cited

U.S. PATENT DOCUMENTS

| 7,188,106 | B2 | 3/2007 | Dwork et al. |
|---|---|---|---|
| 7,899,688 | B2 | 3/2011 | Bonissone et al. |
| 2005/0102202 | A1 | 5/2005 | Linden et al. |
| 2006/0265369 | A1 | 11/2006 | Atcheson et al. |
| 2007/0118546 | A1 | 5/2007 | Acharya |
| 2008/0010272 | A1 | 1/2008 | Schickel-Zuber et al. |
| 2009/0138422 | A1* | 5/2009 | Ghaseminejad Tafreshi .. 706/46 |
| 2010/0191680 | A1 | 7/2010 | Lee et al. |
| 2010/0241625 | A1 | 9/2010 | Aravamudan et al. |
| 2010/0268661 | A1 | 10/2010 | Levy et al. |

OTHER PUBLICATIONS

Sculley "Rank Aggregation for Similar Items", SDM, 2007, pp. 12.*
Dwork et al. "Rank Aggregation Methods for the Web", WWW 10, 2001, pp. 613-622.*
Cao et al. "Learning to Rank: From Pairwise Approach to Listwise Approach", ICML, 2007, 8 pages.*

* cited by examiner

*Primary Examiner* — Li-Wu Chang
(74) *Attorney, Agent, or Firm* — Peter A. Nieves; Sheehan Phinney Bass + Green PA

(57) ABSTRACT

A system and method for providing a personalized recommendation from a series of partial preferences is presented. A preference distribution of a population including a plurality of weighted ranked lists is identified. A revealed preference of a user is compared to the plurality of ranked lists. An affinity weight between the user and each of the plurality of ranked lists is assigned, and a weighted average of each of the affinity weights is taken.

7 Claims, 2 Drawing Sheets

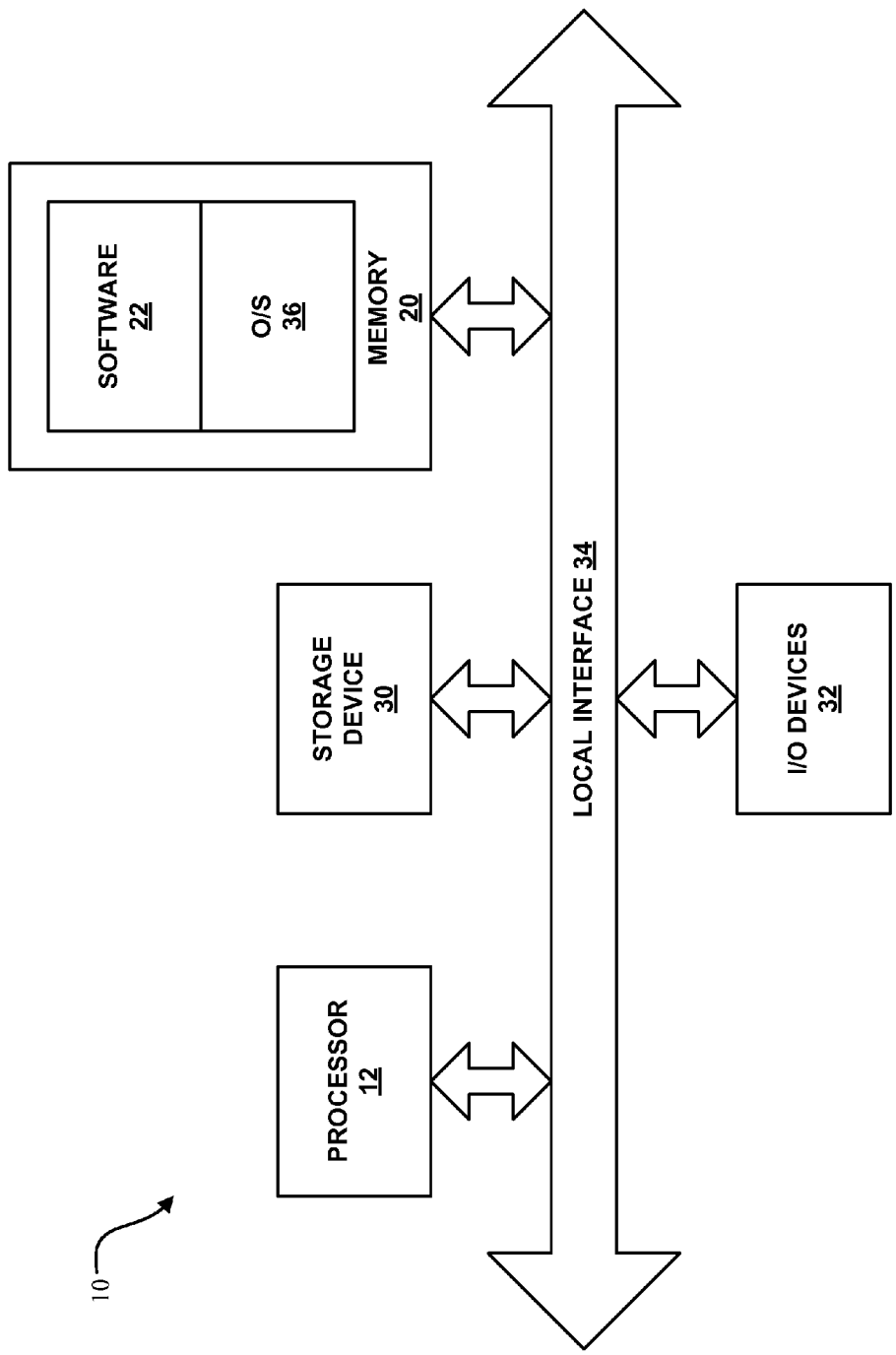

SYSTEM AND METHOD FOR PROVIDING PERSONALIZED RECOMMENDATIONS

CROSS-REFERENCE TO RELATED APPLICATIONS

This application claims the benefit of U.S. Provisional Patent Application Ser. No. 61/528,751, filed Aug. 29, 2011, entitled "SYSTEM AND METHOD FOR PROVIDING PERSONALIZED RECOMMENDATIONS," which is incorporated by reference herein in its entirety.

GOVERNMENT SUPPORT

This invention was made with government support under grant numbers CNS0546590 and NSF1029260 awarded by the National Science Foundation. The Government has certain rights in this invention.

FIELD OF THE INVENTION

The present invention relates to data analysis, and more particularly, is related to aggregation and analysis of personalized recommendations.

BACKGROUND OF THE INVENTION

Existing recommendation systems, such as, but not limited to, Netflix five star ratings, Pandora like/dislike ratings, and other systems, utilize roughly the following methodology:
1) Illicit feedback for a given 'product.' Since this is feedback for a single product the feedback is necessarily delivered as some type of score (for example, like vs. don't like, one star vs. two stars vs. five stars, and other types of scores).
2) Build a customer profile based on how the customer rated various products.
3) Make recommendations to customers by first finding customers 'like' the customer in question and then recommending products that similar customers rated highly. The notion of 'likeness' here is typically defined on the basis of similarity in ratings across rated products.

This prior system has a number of flaws, the most obvious of which is the following: what 'three stars' for a particular product might mean varies both across customers (for example, five stars for a first reviewer is equivalent to three stars for a second reviewer) as well as over time for a given customer (for example, mood might determine how generous a reviewer is with stars). This makes it essentially impossible to get a high fidelity picture of the relative likes and dislikes of a customer both because it becomes difficult to find 'like' customers, and also because the language the customer uses in relating her preferences is itself changing.

Therefore, there is a need for a system and method for providing personalized recommendations.

SUMMARY OF THE INVENTION

Embodiments of the present invention provide a system and method for providing personalized recommendations. Briefly described, a first aspect of the present invention is directed to a method for inferring the preferences of a user in relation to a population, including the steps of identifying a preference distribution of the population having a plurality of complete ranked lists and a weight of each of the plurality of complete ranked lists, comparing a revealed preference of the user to one of the plurality of ranked lists, assigning an affinity weight between the user and each of the plurality of ranked lists, and taking a weighted average of each of the affinity weights.

Briefly described, a second aspect of the present invention is directed to a method for providing a personalized recommendation for an unobserved user, including the steps of predicting a plurality of partial preference of the unobserved user using aggregated partial preferences of a population over a plurality of choices, learning a distribution consistent with the plurality of partial preferences for the unobserved user, and processing the distribution to produce a recommendation.

A third aspect of the invention is directed to a method for providing personalized recommendations, including the steps of receiving, with a computer, revealed user partial preference data, predicting a non-revealed user preference based on the revealed user partial preference data, and producing a personalized recommendation.

Briefly described in architecture, a fourth aspect of the invention is directed to a system for providing a personalized recommendation for an unobserved user having a computer including a processor and a memory. The computer is configured to perform steps including predicting a plurality of partial preference of the unobserved user using the aggregated partial preferences of a population over a plurality of choices, learning a distribution consistent with the plurality of partial preferences for the unobserved user, and processing the distribution to produce a recommendation.

A fifth aspect of the present invention is directed to a computer readable media configured to store non-transient program instructions to perform the steps including predicting a plurality of partial preference of an unobserved user using the aggregated partial preferences of a population over a plurality of choices, learning a distribution consistent with the plurality of partial preferences for the unobserved user, and processing the distribution to produce a recommendation.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

As used within this disclosure, a "pair-wise comparison" consists of the identity of a first item and a second item, and a user preference between the first item and the second item. Various forms of inputs may be translated to pair-wise comparisons, including, but not limited to, ratings, purchase information, transactions, web-logs, and explicit comparison input.

As used within this disclosure, "first order marginal data" is a preference between two items drawn from a preference ordered list of three or more items. First order marginal information for a distribution is the fraction of population that ranks item i as their $k^{th}$ choice among n choices for any $1<=i, k<=n$.

As used within this disclosure, a "partial preference" is an indication of a preference of a first item over a second item. Examples of a partial preference data include a pair-wise comparison and first order marginal data.

As used within this disclosure, a "preference list" is a collection of partial preferences. In general the preference list includes partial preferences collected from the same source or similar sources, using the same or similar collection methodologies. For example, the preference list may include all user ratings of a product on a web site.

As used within this disclosure, a "ranking" is an ordering of items in a list, for example, from most preferred to least preferred. An aggregate ranking is an ordering of the items in a list that reflects the collective preference of the user population.

As used within this disclosure, a "score" is a number assigned to an item reflecting the importance of the item according to the distribution. In general, the higher the score, the higher the importance of the item.

As used within this disclosure, a "weight" is a number assigned to a ranked list proportional to the prominence or frequency in the population of a ranked list.

As used within this disclosure, a "sparse distribution" is a distribution with very few ranked list or permutations or complete preferences with positive probability.

As used within this disclosure, "revealed partial input" is the recorded input provided by users with respect to all the users, in a population.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 2 is a schematic diagram of a computer capable of performing functionality of the present invention.

DETAILED DESCRIPTION

Figure 1:
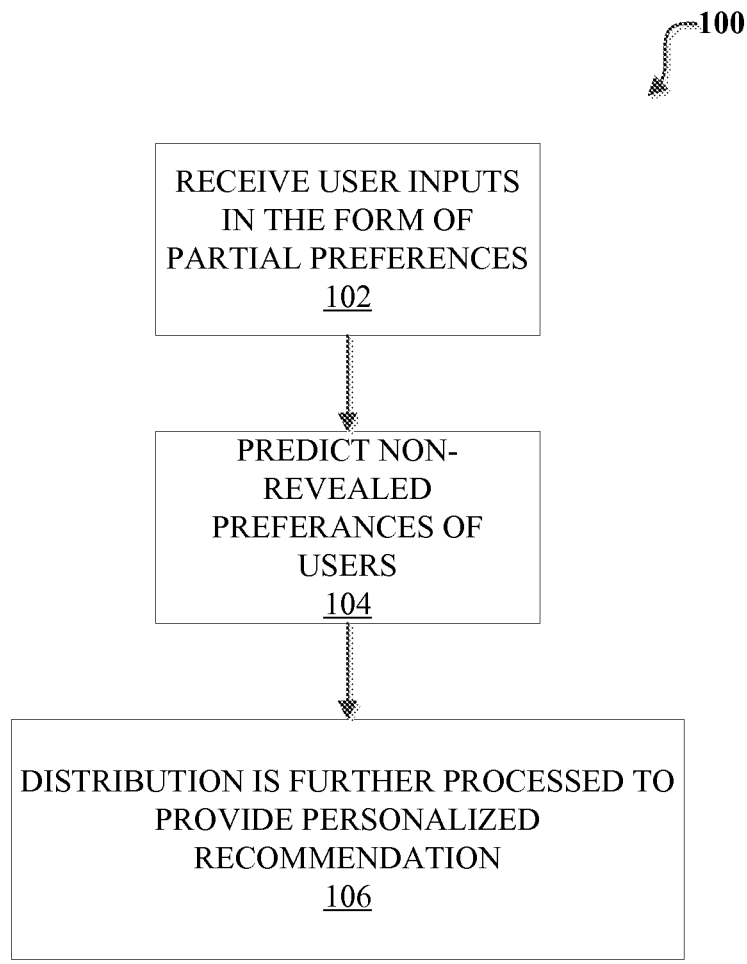
FIG. 1 is a flowchart illustrating functions performed by the present system in providing personalized recommendation.

The present system and method is a recommendation system that addresses the crucial flaw of present day rating methods used in an attempt to recommend product for purchase.

It is noted that while the interpretation of a star rating is fluid, a customer may typically reliably express relative preferences. As a concrete example, a customer that prefers the movie 'The Godfather' to the movie 'Casablanca' is likely to consistently pick the former over the latter when explicitly asked to choose between the two. In contrast, the number of stars the customer awards these movies is likely to vary dramatically with the context in which the rating was sought, the mood of the customer or other such idiosyncratic things. The present system and method provides a comprehensive new recommendation engine directed toward addressing the previously mentioned observation.

FIG. 1 is a flowchart 100 illustrating functions performed by the present system in providing a personalized recommendation. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 102, user inputs are received in the form of partial preferences. An aggregated version of partial preferences of all the users, called the population, is maintained. Using the aggregated partial preferences of the population and the revealed preferences of the particular user, the non-revealed preferences of users are predicted, as shown by block 104. Given the predicted partial preferences of the users, a distribution consistent with the predicted partial preferences is learned. This distribution is processed further to provide personalized recommendations, as shown by block 106. Each of these blocks 102, 104, 106 is described in more detail below.

Block 102

As described below, on order to obtain personalized recommendation in practical settings, the system under a first exemplary embodiment can handle multiple forms of data collected from various sources. To achieve this, among other goals, the system uses pair-wise comparison data as a standard input. Other types of data may be converted to pair-wise comparisons without a loss in information, as described further below. A pair-wise comparison datum consists of the identity of two items and a user preference among the items.

The system can accommodate several types of data. For example, direct comparisons between two items may be collected by giving each user a choice to select between two items, and recording the item that the user selected. Similarly, if a user is presented two items and purchases one of the items, the preference of the purchaser of the purchased item may be inferred. Alternatively, a user may be presented with a list of items and the user is asked to provide a ranked list of all or some of the items. These lists may be converted into pair-wise comparisons using several methods familiar to persons having ordinary skill in the art. For example, a list ranking item A first, item B second and item C third may be broken out as the pair-wise comparisons of A preferred over B, A preferred over C, and B preferred over C.

In a different set of scenarios, the constraints on the data collection process might be more complicated. For example, it may be desirable to collect multiple pair-wise comparisons efficiently without asking the user to rank the whole collection of items, for example, a large collection of items, or to go through a large sequence of comparisons. The process may be simplified by offering the user an assortment of items, and asking her to choose one of the items. This choice can be interpreted as a preference of the chosen item over all of the other items in the assortment. This kind of assortment-choice data may be collected and utilized in many applications. In an online store, for instance, a customer is usually presented with a subset of the items in the store. The user action, for example, a click or purchase, and the identities of the items in the assortment, may then be recorded to create a data point of the aforementioned type.

With some additional data, the same approach is applicable to more complicated situations. For instance, a data set containing all user transaction and inventory records processed at a retail store may be processed into one or more lists of pair-wise preferences. This data may indicate when the user purchased a given item, and a listing of other items the store had available for sale at the time of the sale. Ultimately, this information provides assortment-choice data that may be converted to pair-wise comparisons inferred from the user action.

In another example, transaction data is available without the inventory. Here, it is known what the user purchased, but the assortment of items the user chose the purchased item from is not known. In this case, comparisons may be inferred by detecting patterns in the purchasing behavior of the customer. For example, a customer purchases three kinds of breakfast cereal A, B, and C in the following order: AABC-CCCCCCCC. This sequence indicates that the customer purchased breakfast cereals A and B before choosing C, and thereafter continued to purchase C, which could be translated to a preference of C over both A and B, assuming the continued availability of A and B.

Note that in most of these examples, the user is not expected to provide a complete ranking of a large number of the available items. Expecting the user to compare or rank a large number of items may be unrealistic, and may limit the flexibility of the system to adapt to, for example, changes in the inventory, among other things. Therefore, the input provided by all the users in a population is assumed to be partial. The system may use this revealed partial input of the population to provide personalized recommendation to a given user regarding items that the user has not ranked.

Block 104

As described above, the input to the system may include pair-wise comparisons provided by different users. The comparisons for each user are grouped together and represent the revealed part of the preferences of that user. The preferences for all users are combined to provide the preferences of the population. This last step is performed by finding the frequency with which an item i is preferred to an item j, for all items i and j, across the whole population. This information may be stored, for example, in a matrix indexed by i and j encoding the collective preference of the population. Given this matrix, an inference may be made regarding the entirety of preferences of a specific user using the partial preferences of the specific user. Restated, if the preferences of the user are represented using a matrix, also indexed by i and j, it is desirable to use the available (revealed) entries in this matrix to predict the unavailable (unrevealed) ones. This may be done in two steps. First, process the population data to identify a family of distributions over preferences. Second, use the partial preferences of the user together with the distribution to predict personalized full preferences for the user. This is described further below.

An aspect of the present invention is identifying a family of distributions consistent with the available partial preferences given marginal information. The distributions are usually not unique because the data is insufficient to specify a unique distribution. Therefore, the problem of learning the choice model reduces to the problem of finding an appropriate criterion to select one of the models consistent with the available data. A popular statistical criterion for model selection used extensively in many contexts is the criterion of parsimony, which encourages the selection of the 'most parsimonious' model consistent with the data.

The criterion of parsimony is justified in many ways. The criterion is philosophically consistent with the Occam's razor philosophy, which roughly stated, suggests that under the absence of additional information, one should tend toward simpler theories. In statistical terms, parsimony is born out of the need not to over-fit. Operationally, parsimony is desirable because parsimonious models may be generally easier to handle, both computationally and otherwise.

In parametric models, parsimony has often been translated into parsimony of parameters. For instance, a multinomial logit (MNL) model with N parameters may be considered more parsimonious than an exponential family with $N^2$ parameters. In the nonparametric case, however, the sparsity, or the support size, of the distribution becomes a natural candidate for a measure of parsimony of the model. Furthermore, sparsity may also be naturally born since only marginal information is available. More precisely, a distribution of sparsity no more than $(N-1)^2+1$ is needed to describe the first-order information, which captures the frequency with which an object i is ranked at a position r for all objects i and positions r. Finally, sparse models have found success in both theory and practice in the area of compressive sensing, which has gained recent popularity in the areas of signal processing, coding theory, and streaming algorithms (see D. L. Donoho. Compressed sensing. IEEE Transactions on Information Theory, 52(4):1289-1306, 2006 and E. J. Candes, J. Romberg, and T. Tao. Robust uncertainty principles: Exact signal reconstruction from highly incomplete frequency information. IEEE Transactions on Information Theory, 52(2):489-509, 2006.).

Given the considerations above, the underlying choice model may be recovered by identifying the sparsest distribution that is consistent with the available data. This is further illuminated by the following functionality.

Functionality

A brute-force exhaustive search would result in a computational complexity of $\exp(\Theta(K N \log N))$. In order to obtain a computationally efficient solution, the search may be restricted to a signature family of distributions. With this restriction, the problem of finding a sparse distribution as an integer program (IP) may be formulated with $m^2$ variables and polynomially (in N) many constraints. The IP is not described here due to the required additional notation; see Farias, V. F., Jagabathula, S. and Shah, D. (2012), Sparse choice models, Technical report, MIT, Cambridge, Mass. While the signature family allows reduction of the aforementioned IP with N! variables into an IP with $m^2$ variables, there may not be improvements on the worst-case running time. However, the IP formulation with $m^2$ constraints provides the ability to devise a multiplicative weight update heuristic based on the Plotkin-Shmoys-Tardos (PST) (see Plotkin et al. [1991]) framework. The heuristic is described in detail in Section 5.8 of publication [Farias et al. 2011]. The following guarantees for the heuristic are provided. Assuming access to partial information and existence of a model $\lambda^*$ of sparsity K in the signature family such that $\|y-A\lambda^*\|\leq \epsilon$, the multiplicative weight update heuristic will have a computational complexity of $O(\exp(\Theta(K \log N)))$ with a model $\hat{\lambda}$ such that $\|y-A\hat{\lambda}\|<\epsilon$ and the sparsity of $\hat{\lambda}$ is $O(K \log N)$.

Personalization

Once distribution consistent with the data has been identified, distribution may be used to infer the preferences of a user. As noted above, the sparse distribution consists of complete ranked lists and their weights. Since a fully ranked list provides comparisons between every pair of items, list may be represented by a comparison matrix indexed by i and j, where, for example, entry (i, j) is set to 1 if item i is preferred to item j, and 0 otherwise. Of course, other numerical indications of preference of a matrix entry are also possible. Given the user partial comparison matrix, revealed items may be used to find the affinity between the user and the ranked lists (or matrices) from the distribution. The affinity between the user and a ranked list k, $w_k$, is proportional to how similar the revealed preferences of the user are to the ranked list k. The final prediction for the user comparison matrix is then taken as a weighted average of the population comparison matrices, using weights $w_k$.

Block 106

As mentioned above, the output of the prediction process in block 104 is a comparison matrix computed using the revealed preference of the user and the distribution obtained from the population. This comparison matrix is used to compute the personalized ranking of the user. This may be done by computing a score for each item, and ranking the items by score in a decreasing manner. The score for an item i is the computed by taking the average of the $i^{th}$ row in the comparison matrix of the user.

There are two key processing steps to be performed. First, predicting the partial preferences of an unobserved user using the aggregated partial preferences of a population over all choices. Second, using the predicted partial preferences to learn a distribution consistent with it for the particular user and then processing the distribution to produce a recommendation. The first step is the standard Collaborative Filtering steps applied to different type of inputs. In the standard collaborative filtering, where inputs are, for example, ratings, the ratings of the users for objects that are not rates are predicted by the help of other similar users. The system and method applies a similar procedure to produce unobserved partial preferences of a given user with the help of partial preferences of the similar users in the population, where users are similar in terms of their revealed partial preferences. The second step involves using the predicted partial preferences of users to learn a distribution of the particular user over the unobserved choices. One or more of different methods may be employed to perform this step of learning appropriate distribution from partial preferences. An example of a method that may be used to learn appropriate distribution from partial preferences is provided by the publication entitled, "Inferring rankings using constrained sensing," by S. Jagabathula and D. Shah, IEEE Transactions on Information Theory, June 2011. In addition, a second example of a method that may be used to learn appropriate distribution from partial preferences is provided by the publication entitled, "A Nonparametric Approach to Modeling Choice with Limited Data," by V. Farias, S. Jagabathula and D. Shah, Management Science, June 2011. More recently, in the publications "Sparse Choice Models," by V. Farias, S. Jagabathula and D. Shah (2012 Technical report, MIT, Cambridge, Mass.) as well as "Compare, Don't Score," by A. Ammar and D. Shah(49th Allerton Conference on Communication, Control, and Computing, 2011), two distinct computationally efficient methods have been proposed for learning distribution from partial preferences as well. All of the abovementioned publications are incorporated herein by reference in their entirety as if the individual disclosures were provided herein.

Data Used

Instead of using data that consists of the preferences of customers as measured by product scores, the present system and method uses data that contains a set of relative preferences across products for each customer. For example, to obtain preferences of a user of over restaurants, a user may be asked to compare pairs of restaurants at a given point of time. The user may respond by providing which of the two restaurants she prefers over the other. Of course, comparing two restaurants is just one example. More generally, the preference data may include, for example, ordering of more than two restaurants. Similarly, two movies, or two other items may be compared. As expected, this set of preferences is likely to be partial. For example, a user may have watched ten movies and may have an ordering of all of these ten movies in mind, but may provide ordering of two movies at a time, for example. In this example of ten movies, there are forty-five distinct pairs of movies that can be compared by a user. However, only a smaller number of these pairs may be actually compared. For example, movie pairs (1,2), (1,3), (2,3) and (5, 6) may have been compared by a user among the ten movies.

Data Acquisition

Under the present system and method the above data may be acquired in several ways, including, but not limited to, customer feedback, customer rankings, critic rankings, and implicit feedback. With customer feedback, instead of asking customers to provide ratings for a single product, the system may prompt customers to compare a given product with any or all of a set of products. For customer ranking, the customer may be presented with a palette of products. The customer can then choose to rank any or all of the products among themselves. For critic ratings, feedback from existing databases can be post processed to derive comparison data. The commonality of the identify of a critic may be verified. For example, critic rating may be in starred format, where five stars indicates the highest ranking and one star indicates the lowest. For implicit feedback, a customer may click or choose one of several options presented or displayed to her. This might indicate the customer prefers the option chosen or clicked over all others on display.

Recommendation Calculation

The present system and method provide a form of customer preference data that is resilient to the flaws of an explicit product rating system. The present system and method provide functionality that uses the data described above to produce recommendations for a user.

The unknown preferences of a user may be thought of as a distribution over all possible rankings of products. Whereas such an approach to think about preferences of a population is not new, it is indeed novel to consider choices of an individual as uncertain and capture them by a distribution over all possible rankings. This view allows processing of the partial preferences of the user with the help of the aggregate partial preferences of the population to eventually produce a recommendation for the user. Given input obtained implicitly or explicitly from customers as described above, the functionality assumes that the overall preferences of a customer are modeled by a distribution over all possible rankings of all products. The revealed partial preferences of the customer are essentially consistent with this unknown distribution. The partial preferences over products that a user has not expressed any opinion of are predicted for the given user by using aggregate partial preferences of population, as are the preferences for which recommendations are sought. Specifically, using a collaborative filtering like approach on partial preferences rather than ratings, the present system and method predict partial preferences of a given user on the products that the user has not expressed any opinion. The present system and method utilize thus predicted partial preferences for a given user to produce a distribution over rankings consistent with it. This distribution is further processed to produce a final recommendation for the user. This processing can be done in one of the many ways familiar to persons having ordinary skill in the art. For example, a standard aggregation algorithm like Hare's method for proportional ranking for ranked election may be used to process the distribution and declare the winning ranked list as recommendation for the user. Past attempts at executing the above functionality typically relied on addressing the high dimensionality of the problem by making parametric modeling assumptions. In contrast, functions performed by the present system and method, such as by mathematical algorithms introduced, are non-parametric at every stage. Moreover, past attempts did not use partial preference data or relative preferences rather than ratings to learn the preferences of a user.

Over time, a customer may provide an increasing number of partial preferences. Incorporation of this additional information may help determine the choices or preferences of the particular customer better over time. Thus, the present system and method learns about the customer more over time as it receives more feedback from the customer. This customer-centric distribution is then used to make product recommendations in several standardized ways.

System

Functionality performed by the present invention can be implemented in software, firmware, hardware, or a combination thereof. In a first exemplary embodiment, a portion of the present system is implemented in software, as an executable program, and is executed by a special or general-purpose digital computer, such as a personal computer, personal data assistant, smart phone, workstation, minicomputer, or mainframe computer. The first exemplary embodiment of a computer 10 capable of performing functionality of the present invention is shown in FIG. 2.

Generally, in terms of hardware architecture, the computer 10 includes a processor 12, memory 20, storage device 30, and one or more input and/or output (I/O) devices 32 (or peripherals) that are communicatively coupled via a local interface 34. The local interface 34 can be, for example but not limited to, one or more buses or other wired or wireless connections, as is known in the art. The local interface 34 may have additional elements, which are omitted for simplicity, such as controllers, buffers (caches), drivers, repeaters, and receivers, to enable communications. Further, the local interface 34 may include address, control, and/or data connections to enable appropriate communications among the aforementioned components.

The processor 12 is a hardware device for executing software, particularly that stored in the memory 20. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 20 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 20 may incorporate electronic, magnetic, optical, and/or other types of storage media. Note that the memory 20 can have a distributed architecture, where various components are situated remote from one another, but can be accessed by the processor 12.

The software 22 in the memory 20 may include one or more separate programs, each of which contains an ordered listing of executable instructions for implementing logical functions of the computer 10, as described below. In the example of FIG. 2, the software 22 in the memory 20 defines the computer 10 functionality in accordance with the present invention. In addition, although not required, it is possible for the memory 20 to contain an operating system (O/S) 36. The operating system 36 essentially controls the execution of computer programs and provides scheduling, input-output control, file and data management, memory management, and communication control and related services.

The computer 10 may be provided by a source program, executable program (object code), script, or any other entity containing a set of instructions to be performed. When a source program, then the program needs to be translated via a compiler, assembler, interpreter, or the like, which may or may not be included within the memory 20, so as to operate properly in connection with the O/S 36? Furthermore, the computer 10 functionality can be written as (a) an object oriented programming language, which has classes of data and methods, or (b) a procedure programming language, which has routines, subroutines, and/or functions.

The I/O devices 32 may include input devices, for example but not limited to, a touch screen, a keyboard, mouse, scanner, microphone, or other input device. Furthermore, the I/O devices 32 may also include output devices, for example but not limited to, a display, or other output devices. The I/O devices 32 may further include devices that communicate via both inputs and outputs, for instance but not limited to, a modulator/demodulator (modem; for accessing another device, system, or network), a radio frequency (RF), wireless, or other transceiver, a telephonic interface, a bridge, a router, or other devices that function both as an input and an output.

When the computer 10 is in operation, the processor 12 is configured to execute the software 22 stored within the memory 20, to communicate data to and from the memory 20, and to generally control operations of the computer 10 pursuant to the software 22. The software 22 and the O/S 36, in whole or in part, but typically the latter, are read by the processor 12, perhaps buffered within the processor 12, and then executed.

When the functionality of the invention is implemented in software, as is shown in FIG. 2, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality of the present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The storage device 30 of the computer 10 may be one of many different types of storage device, including a stationary storage device or portable storage device. As an example, the storage device 30 may be a magnetic tape, disk, flash memory, volatile memory, or a different storage device. In addition, the storage device may be a secure digital memory card or any other removable storage device 30.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for inferring the preferences of a user in relation to a population with a computer comprising a processor and a memory containing non-transitory instructions configured to be executed by the processor, comprising the steps of:
producing a sparse preference distribution of said population comprising a plurality of complete ranked lists and a weight of each of said plurality of ranked lists;
comparing a revealed preference of said user to one of said plurality of ranked lists;
assigning, based upon said comparing, an affinity weight between said user and each of said plurality of ranked lists;
taking a weighted average of each of said affinity weights; and
representing each of said plurality of ranked lists as a two dimensional partial comparison matrix of entries comprising a first index and a second index,
wherein each index indicates an item and each entry of said matrix of entries is set to a first value if said first index item is preferred to said second index item, and otherwise set to a second value if said second index item is preferred to said first index item.

2. The method of claim 1, wherein said affinity weight between said user and a ranked list is proportional to how similar said revealed preference of said user is to said ranked list.

3. The method of claim 1, wherein said first value is one and said second value is zero.

4. The method of claim 1, further comprising the steps of:
receiving, by said computer, a plurality of partial preferences;
learning said sparse preference distribution from said plurality of partial preferences; and
processing said sparse distribution to rank a first preference list against a second preference list.

5. The method of claim 4, further comprising the step of selecting said plurality of partial preferences from said first preference list and said second preference list.

6. A method for inferring the preferences of a user in relation to a population with a computer comprising a processor and a memory containing non-transitory instructions configured to be executed by the processor, comprising the steps of:
identifying a sparse preference distribution of said population comprising a plurality of ranked lists and a weight of each of said plurality of ranked lists;
comparing a revealed preference of said user to one of said plurality of ranked lists;
assigning, based upon said comparing, an affinity weight between said user and each of said plurality of ranked lists;
taking a weighted average of each of said affinity weights; and
representing each of said plurality of ranked lists as a two dimensional partial comparison matrix of entries comprising a first index and a second index,
wherein each index indicates an item and each entry of said matrix of entries is set to a first value if said first index item is preferred to said second index item, and otherwise set to a second value if said second index item is preferred to said first index item.

7. The method of claim 6, wherein said first value is one and said second value is zero.

* * * * *